(12) United States Patent
Franke

(10) Patent No.: US 7,007,350 B1
(45) Date of Patent: Mar. 7, 2006

(54) SPRING-LOADED COMPRESSION CABLE GRAB

(76) Inventor: Gary J. Franke, 712 Corte De Encinitas, Camarillo, CA (US) 93010

( * ) Notice: Subject to any disclaimer, the term of this patent is extended or adjusted under 35 U.S.C. 154(b) by 71 days.

(21) Appl. No.: 10/747,706

(22) Filed: Dec. 23, 2003

(51) Int. Cl.
*F16G 11/04* (2006.01)

(52) U.S. Cl. .................................. 24/136 R; 24/136 B

(58) Field of Classification Search ............. 24/136 B, 24/136 R, 115 M; 294/132, 134, 102.1; 403/369, 314, 374.4; 439/820; 279/49, 279/52, 53, 56
See application file for complete search history.

(56) References Cited

U.S. PATENT DOCUMENTS

| | | | |
|---|---|---|---|
| 2,056,036 A * | 9/1936 | Catron et al. ............... | 439/820 |
| 2,166,457 A * | 7/1939 | Berndt ....................... | 439/820 |
| 3,344,485 A * | 10/1967 | Lommen et al. ............ | 403/369 |
| 3,544,142 A * | 12/1970 | Moss, Jr. .................... | 403/78 |
| 3,868,748 A * | 3/1975 | Kelly ....................... | 24/115 M |
| 4,145,566 A * | 3/1979 | Weingartner .............. | 174/65 R |
| 5,594,977 A * | 1/1997 | McCallion ................ | 24/136 B |

FOREIGN PATENT DOCUMENTS

CH         687221 A5 * 10/1996

* cited by examiner

*Primary Examiner*—James R. Brittain
(74) *Attorney, Agent, or Firm*—Albert O. Cota

(57) ABSTRACT

A spring-loaded compression cable grab (20) that is used for cinching and attaching a wire rope cable to a fixed object. The cable grab consists of a hollow cylindrical chuck (26) having a tapered socket (32) and a pair of bifurcated arms (40) attached to the sides. A collet (46) is disposed within the tapered socket that includes a bore (48) within, having an inside diameter compatible with a wire rope cable. A hollow chuck cap (54) is attached to the chuck with a compression spring (60) disposed within the chuck between the collet and the chuck cap, which urges the collet into the tapered socket. The grab functions such that after a cable has been inserted into the chuck first end and is manually cinched tightly, the collet firmly grips a wire rope cable on the bore in the collet when a cable is pulled in an opposite direction. A hollow bolt (62) is attached to the chuck and when rotated inward against the collet, the collet is forced away from the tapered socket, thus releasing the grip for de-tensioning or removal of the cable grab from the wire rope cable.

14 Claims, 6 Drawing Sheets

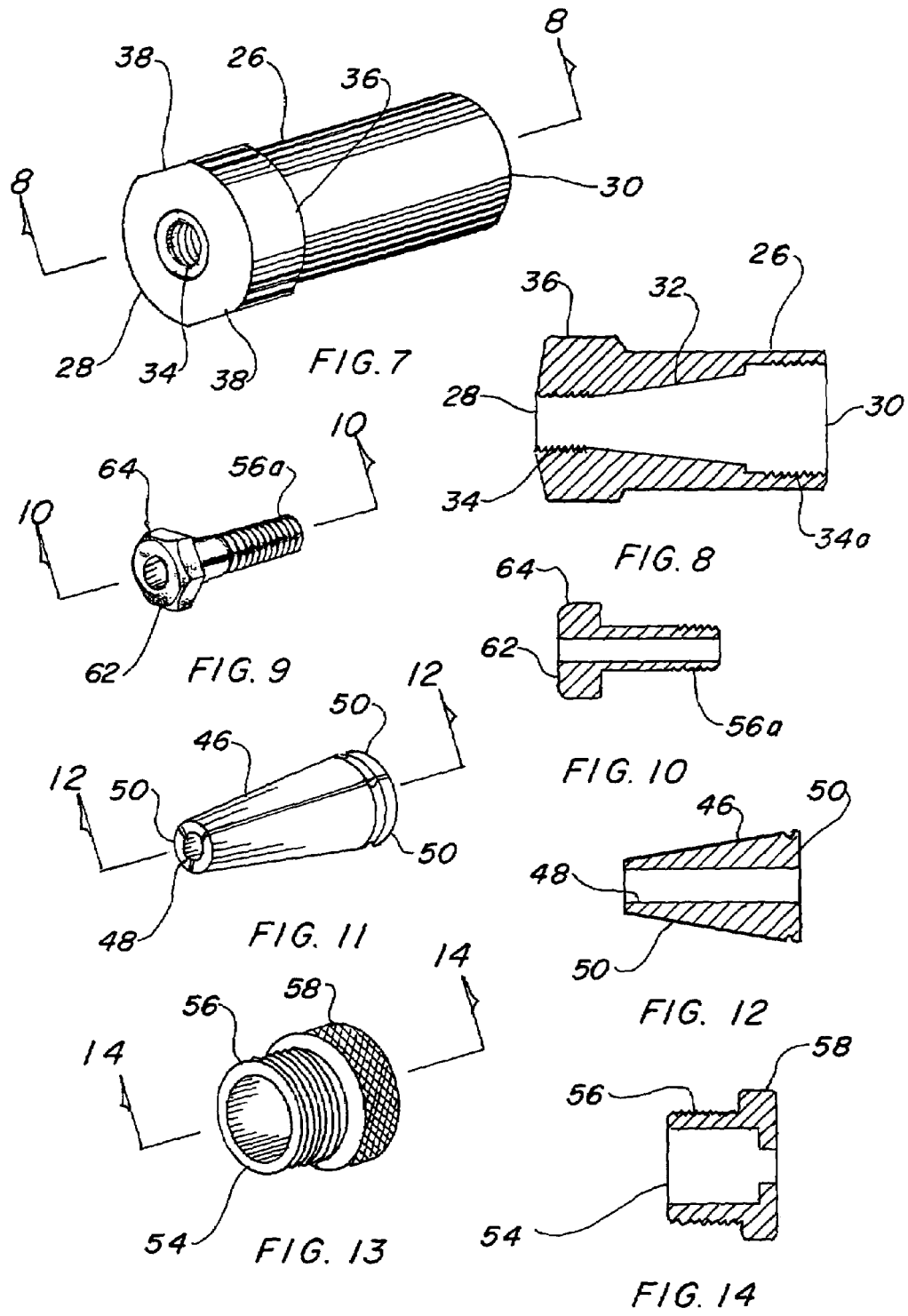

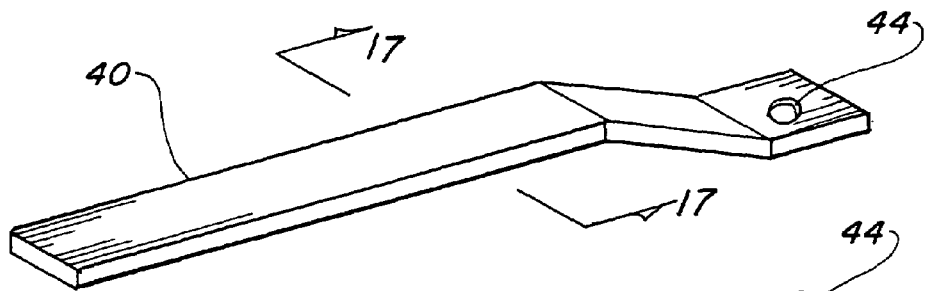
FIG. 15
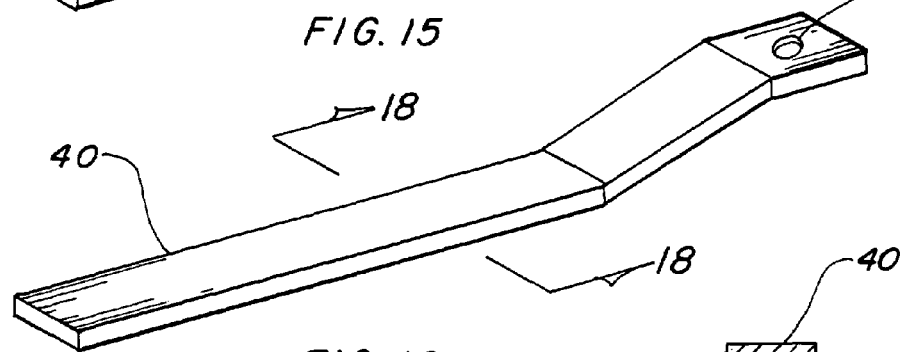
FIG. 16
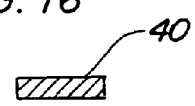
FIG. 18
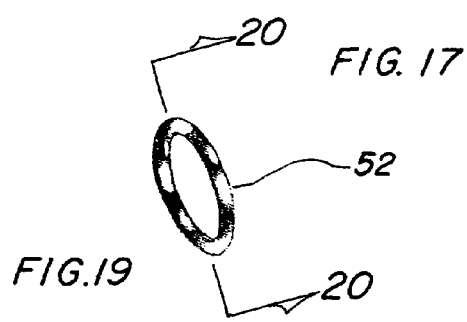
FIG. 17
FIG. 19
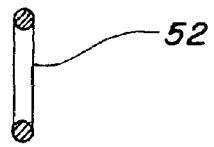
FIG. 20
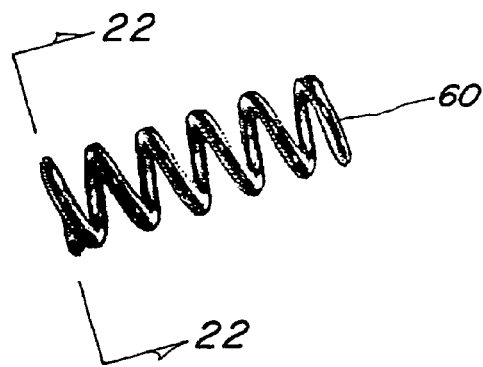
FIG. 21
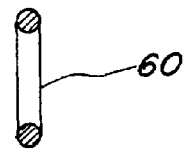
FIG. 22

SPRING-LOADED COMPRESSION CABLE GRAB

TECHNICAL FIELD

The invention generally pertains to cable grabs, which are also designated as cable grips, and more specifically to a cable grab utilizing a spring-loaded collet that is inserted into a chuck having a bifurcated bracket. The cable grab permits a wire rope cable to penetrate through the grab, gripping the cable by spring tension on the collet which permits manual tightening of the cable line without disconnection.

BACKGROUND ART

Previously, many types of cable grips or grabs have been used in endeavoring to provide an effective means for tightening a wire rope cable to a fixed position and allowing removal or loosening of the cable. This use is particularly adaptable for horizontal lifeline applications.

The prior art listed below did not disclose any patents that possess the novelty of the instant invention, however the following U.S. patents are considered related:

| Pat. No. | Inventor | Issue Date |
| --- | --- | --- |
| 4,114,242 | Luthi | Sep. 19, 1978 |
| 5,677,975 | Burek et al. | Oct. 13, 1997 |
| 5,924,522 | Ostrobrod | Jul. 20, 1999 |
| 6,446,936 | Ostrobrod | Sep. 10, 2002 |
| 6,581,725 | Choate | Jun. 24, 2003 |

U.S. Pat. No. 4,114,242 issued to Luthi discloses a cable grip or gripping apparatus that uses tapered segmented grips to de-tension a tensioned member. The apparatus consists of a body with slotted gripping means having similar tensioning members gripping a cable. The gripping means are in coaxial configuration with the tensioning members.

U.S. Pat. No. 5,677,975 issued to Burek et al. discloses a grip block assembly having a hollow frame with wall openings that allow an elongated member to pass therethrough. Lever arms pivot on the same axis as a cable functions in a scissoring manner to grip the cable surface. An actuator block has depending members which contact the lever arms, thus causing them to pivot with respect to each other.

U.S. Pat. No. 5,924,522 issued to Ostrobrod discloses a cable grab which has a frame assembly with a U-shaped bracket and a pair of spaced-apart side plates which fit around the cable. A secondary frame fits within the U-shaped bracket and carries a brake in the form of a pulley mounted in an elongated slot that locks in the event of a fall.

U.S. Pat. No. 6,446,936 issued to Ostrobrod discloses a lifeline safety apparatus consisting of housing secured to an anchor point. The free end of the lifeline is connected to a cable passing around a drum, and an adjustable lever winds the drum. When tension on the lifeline reaches a desired level a brake slips and the lever rotates freely.

U.S. Pat. No. 6,581,725 issued to Choate discloses a method for creating a horizontal lifeline between two anchorages. A section of the lifeline has a modulus of elasticity, thereby providing shock absorbing capabilities and is tuned to equal the deployment load.

DISCLOSURE OF THE INVENTION

The primary object of the invention is to permit an apparatus to feed the distal end of a wire rope cable through a grab freely and yet grip the cable tightly when pulled in an opposite direction. This object is accomplished easily by the use of a spring-loaded collet within a chuck. When the cable is threaded into the invention, the collet is pushed away from a tapered portion of the chuck, thus allowing the jaws of the collet to separate and permit the cable to pass through. This permits the cable to be manually pulled tight when it is attached to a fixed object on one end, and the apparatus is attached to a second fixed position on the other, which takes up all of the slack and tightens the cable in between. This function is particularly effective when used in conjunction with a horizontal lifeline, which is commonly used in the construction trade. The lifeline is moved frequently and final tensioning is accomplished by tightening a turnbuckle, therefore a fixed length of the cable is impractical as the overall length of the lifeline is not always the same. The invention fills the need for quick and easy removal and installation of a lifeline in a host of different locations, as the cable is manually tightened, thus permitting final tensioning by a turnbuckle, which has a limited displacement.

While the cable grab is used primarily for horizontal lifelines, an important object of the invention is it may be used in a myriad of other applications where a wire rope cable is utilized.

Another object of the invention is that the cable grab holds a wire rope tightly when tensioned between two points, the more force that is exerted on the cable, the tighter the grip is on the collet as it is drawn into a tapered socket on the chuck.

Still another object of the invention is that the cable grab may be released easily by rotating the hollow bolt on one end with a common wrench, which spreads the jaws of the collet.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 7 is a partial isometric view of a hollow cylindrical chuck used in the cable grab shown removed from the invention for clarity.

FIG. 8 is a cross-sectional view taken along lines 8—8 of FIG. 7.

FIG. 9 is a partial isometric view of a hollow bolt used in the cable grab shown removed from the cable grab for clarity.

FIG. 10 is a cross-sectional view taken along lines 10—10 of FIG. 9.

FIG. 11 is a partial isometric view of a collet used in the cable grab shown removed from the cable grab for clarity.

FIG. 12 is a cross-sectional view taken along lines 12—12 of FIG. 11.

FIG. 13 is a partial isometric view of a hollow chuck cap used in the cable grab shown removed from the cable grab for clarity.

FIG. 14 is a cross-sectional view taken along lines 14—14 of FIG. 13.

FIG. 15 is a partial isometric view of a first arm used in the cable grab shown removed from the cable grab for clarity.

FIG. 16 is a partial isometric view of a second arm used in the cable grab shown removed from the cable grab for clarity.

FIG. 17 is a cross-sectional view taken along lines 17—17 of FIG. 15.

FIG. 18 is a cross-sectional view taken along lines 18—18 of FIG. 16.

FIG. 19 is a partial isometric view of an o-ring used in the collet of the fable grab shown removed from the cable grab for clarity.

FIG. 20 is a cross-sectional view taken along lines 20—20 of FIG. 19.

FIG. 21 is a partial isometric view of a compression spring used in the cable grab shown removed from the cable grab for clarity.

FIG. 22 is a cross-sectional view taken along lines 22—22 of FIG. 21.

BEST MODE FOR CARRYING OUT THE INVENTION

Figure 1:
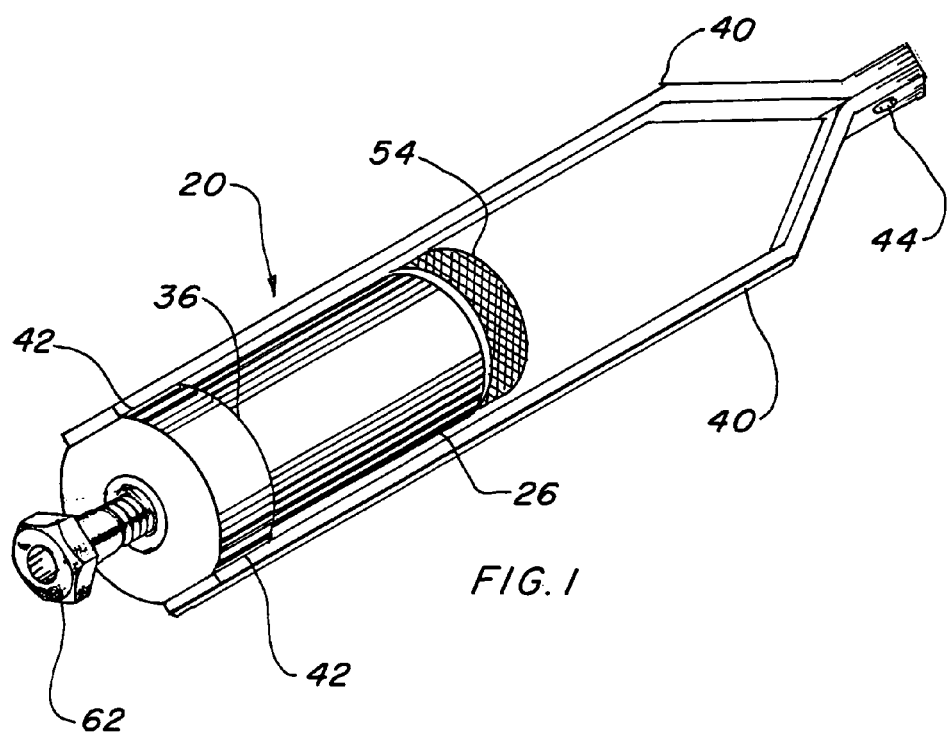
FIG. 1 is an isometric view of the spring-loaded compression cable grab.
Figure 2:
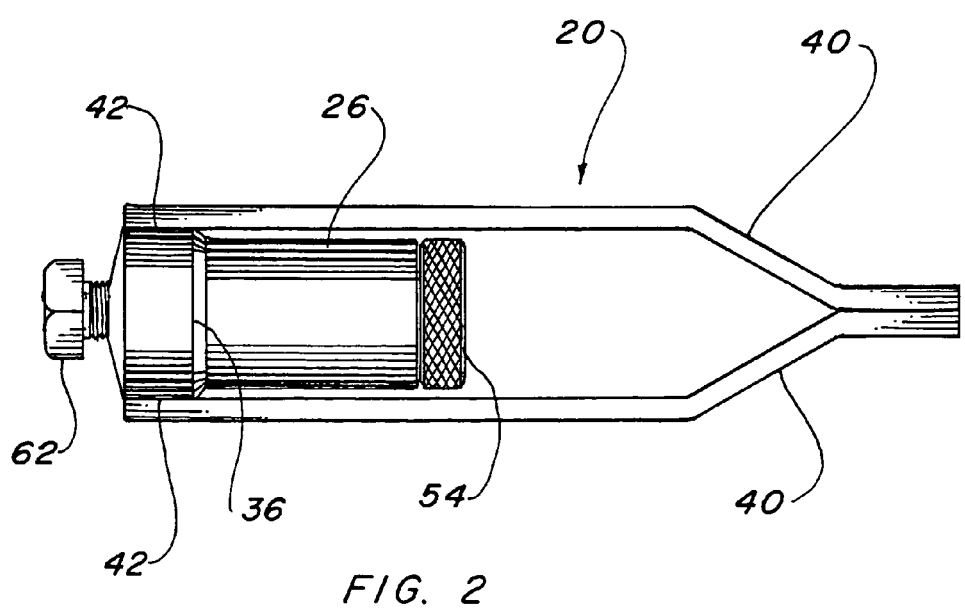
FIG. 2 is a side view of the cable grab.
Figure 3:
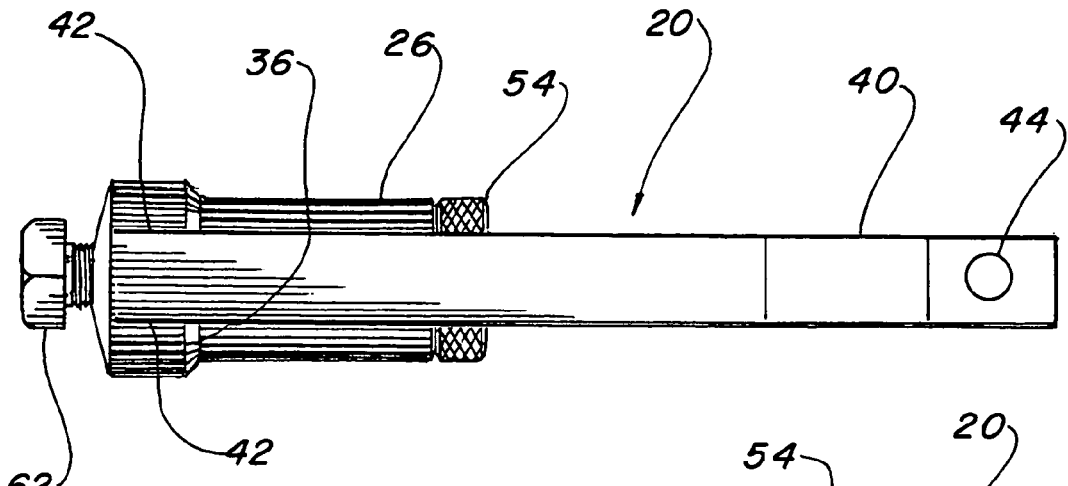
FIG. 3 is a top view of the cable grab.
Figure 5:
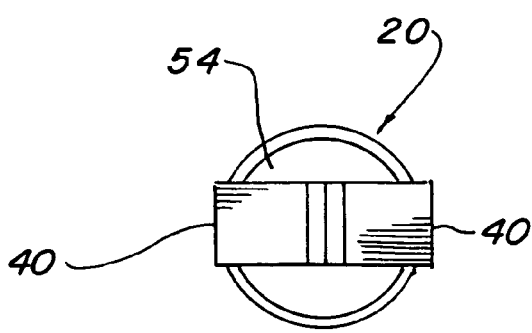
FIG. 5 is a rear view of the cable grab.
Figure 4:
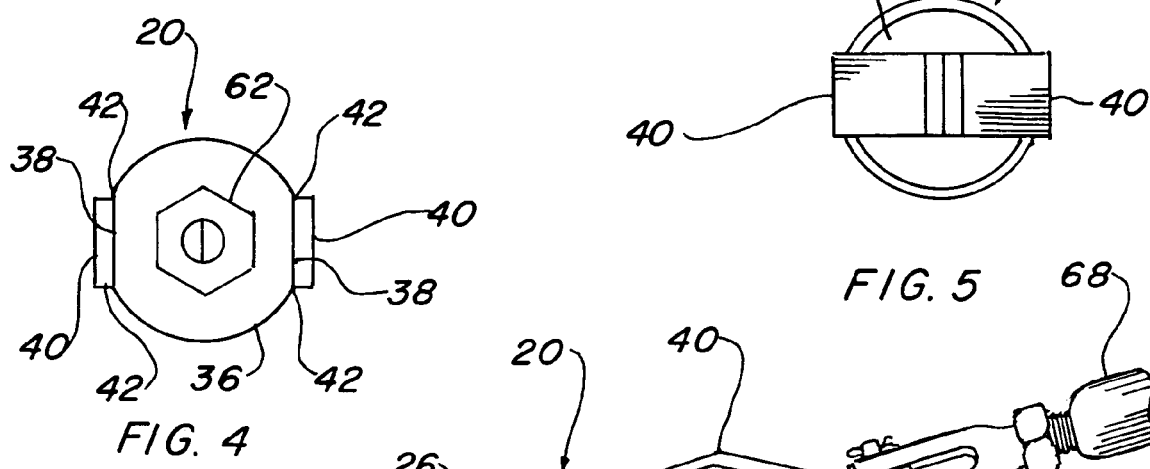
FIG. 4 is a front view of the cable grab.

The best mode for carrying out the invention is presented in terms of a preferred embodiment. The preferred embodiment, as shown in FIGS. 1 through 25, is comprised of a spring-loaded compression cable grab 20 for attaching a wire rope cable 22, such as these utilized in a horizontal lifeline or the like, to a fixed object 24.

The cable grab 20 consists of a hollow cylindrical chuck 26, having with a first end 28 and a second end 30, with a tapered socket 32 formed within the hollow between the first and second ends. The hollow cylindrical chuck 26 includes internal threads 34 on the first end 28, and internal threads 34a on the second end 30, for receiving threaded elements. The hollow cylindrical chuck is in a cylindrical configuration, as shown in FIGS. 1–8, and has an enlarged circular portion 36 on the first end 28 which includes a pair of opposed flats 38.

A pair of bifurcated arms 40 are attached onto the chuck 26 for substantial attachment of the cable grab 20 to a fixed object 24. The pair of bifurcated arms 40 are attached onto the flats 38 of the enlarged portion 36 of the hollow cylindrical chuck 26, preferably with a weld joint 42, as shown in FIGS. 1–6. The bifurcated arms 40 have a shape that is offset to contiguously engage each of the arms 40 on an end opposite the weld joint 42. Where the pair of bifurcated arms 40 unitedly join together, a clearance hole 44 is provided that penetrates completely through both arms 40 and is used for the attachment of the cable grab 20 to the fixed object 24.

A collet 46 is slideably disposed within the tapered socket 32 of the hollow chuck 26, with the collet including a centrally-positioned bore 48 therethrough having an inner diameter that is compatible with the wire rope cable 22. It should be noted that for a horizontal lifeline, a ⅜ inch (0.98 cm) diameter is relatively standard in the industry, however any applicable size cable may be substituted with ease as the invention is not limited to a particular size cable or application as the cable grab 20 has utility for many and varied purposes. The collet 46 is made with a plurality of tapered segments 50 that are retained with an o-ring 52 on the collet's largest end for gripping the cable 22 contained by the bore 48 formed within the segments 50. The collet 46 is illustrated in FIGS. 11, 12 and 23, with the collet tapered segments 50 preferably made in three discrete segmented elements, however more elements may be used for larger diameter cables.

Figure 23:
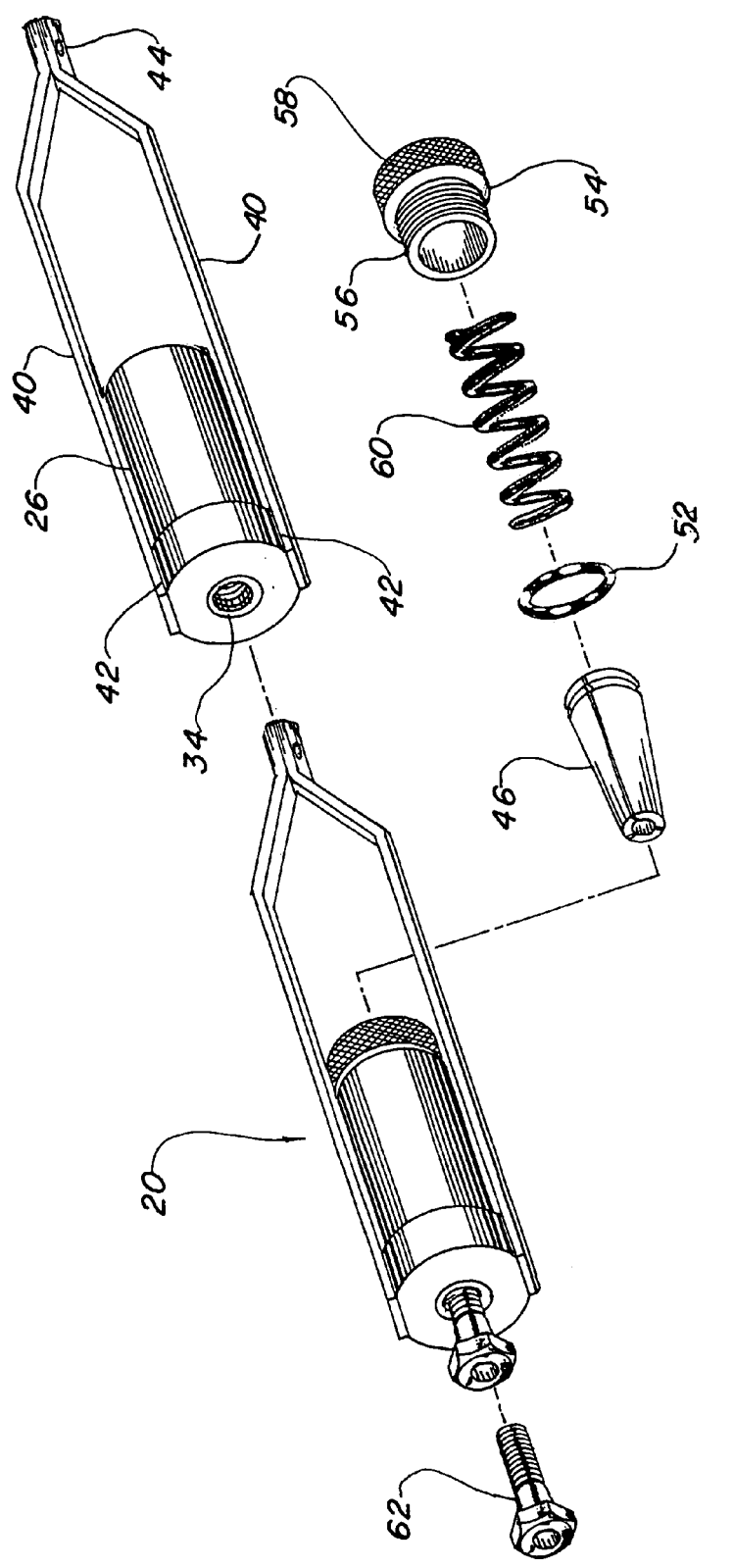
FIG. 23 is an exploded view of the cable grab.

A hollow chuck cap 54 is attached to the second end 30 of the chuck 26, as illustrated in FIGS. 1–3, 5, 6 and 23. The hollow chuck cap 54 includes a set of external threads 56 for attachment to the internal threads 34a that are cut into the second end 30 of the chuck 26, as shown in FIGS. 13 and 14. The chuck cap 54 has a knurled surface 58 machined on an end opposite the external threads 56, as illustrated in FIGS. 13 and 23.

A compression spring 60, as shown in FIGS. 21–23, is disposed within the hollow of the chuck 26 between the collet 46 and the chuck cap 54, urging the collet 46 into the tapered socket 32. The collet therefore firmly grips the wire rope cable 22 after the cable 22 has been inserted into the bore 48, in the collet 46 while permitting the cable 22 to enter from the first end 28 of the chuck 26. The compression spring 60 is of industry standard construction and is formed of a material such as stainless steel or spring steel.

A hollow bolt 62 is threadably attached to the internal threads 34 of the chuck 26 on the first end 28 and is used for removal of the cable grip 20 from the cable 22. When the hollow bolt 62 is rotated inward against the collet 46, the collet 46 is forced away from the tapered socket 32 in the chuck 26, thereby releasing the grip on the cable 22. The hollow bolt 62 preferably has a hex head 64 on one end and a plurality of external threads 56a on the other, with the threads 56a compatible with the internal threads 34 on the first end 28 of the cylindrical chuck 26.

The spring-loaded compression cable grab 20 is preferably manufactured using all-steel construction, however other materials, such as aluminum is considered to be an acceptable substitute.

Figure 6:
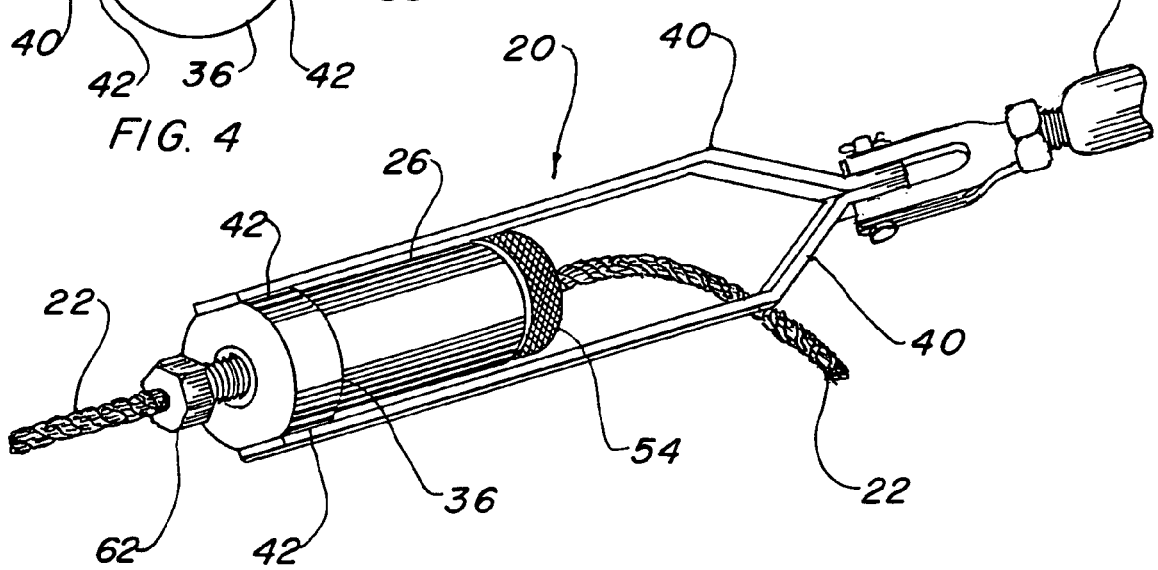
FIG. 6 is an isometric view of the cable grab having a cable inserted into the cable grab and a set of arms attached to a turnbuckle illustrating the utility of the invention.
Figure 24:
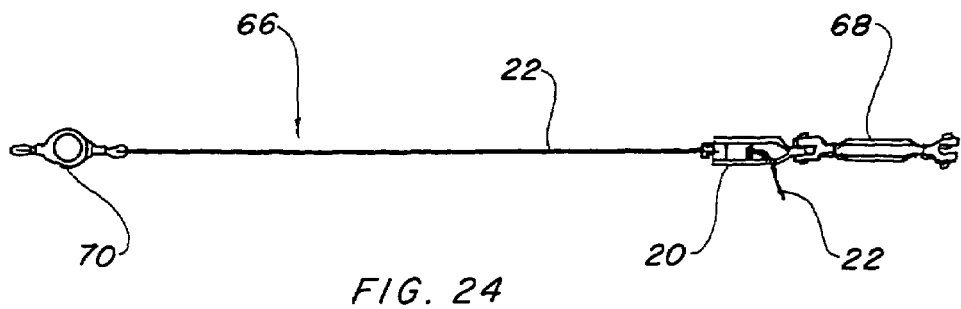
FIG. 24 is a view showing the cable grab used in combination with a horizontal lifeline.
Figure 25:
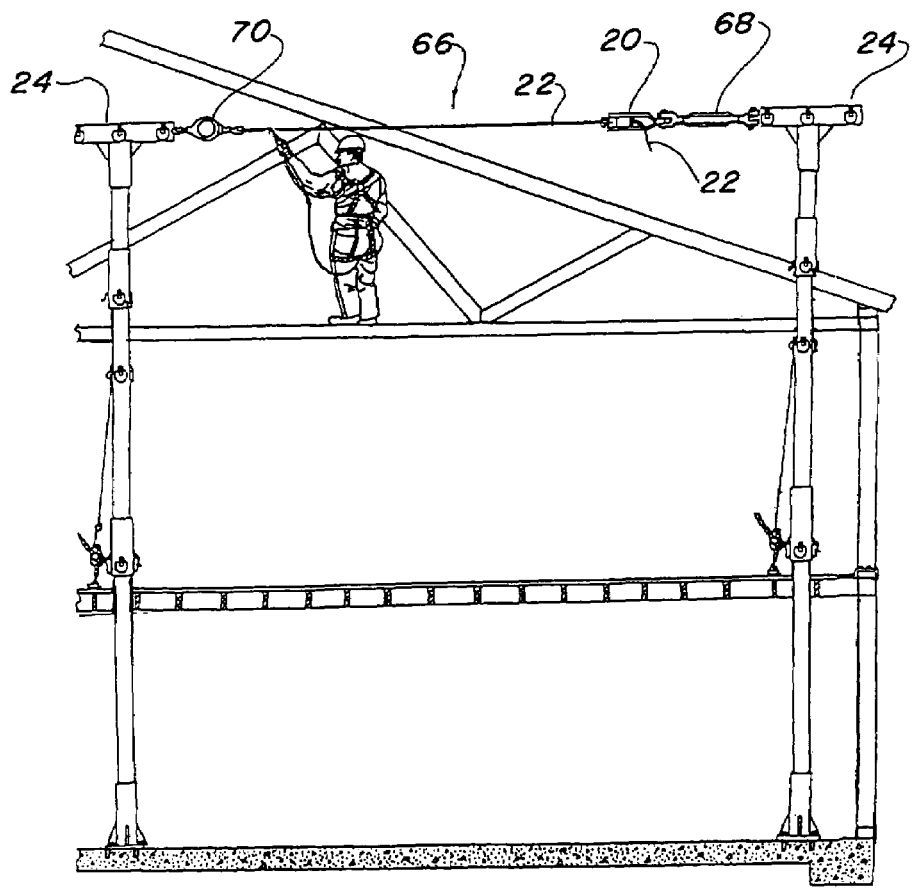
FIG. 25 is an elevational view of the cable grab as applied to a lifeline in conjunction with a fall-protection restraint apparatus employing a pair of opposed poles.

While the invention may be used for many other purposes, an exemplary utility is illustrated in FIGS. 24 and 25, wherein the cable grab 20 is used in conjunction with a horizontal lifeline. FIG. 23 depicts a lifeline 66 connected between two stationary fixed objects 24, with a jaw and jaw turnbuckle 68 on one end of the lifeline 66 and the spring-loaded compression cable grab 20 attached to an inboard jaw on the turnbuckle 68. The cable 22 extends through the grab 20 through the first end 28 of the chuck 26, with the distal end of the cable 22 attached to a shock absorber 70 in a conventional manner, which is likewise connected to the fixed object 24. In operation, the turnbuckle 68 and cable grab 20 remain connected together, and the turnbuckle 68 is attached to one of the fixed objects 24. The cable 22 and shock absorber 70 also remain attached, and the shock absorber 70 is connected to the remaining fixed object 24, as shown in FIG. 25. The cable 22, which has already been manually inserted into the hollow bolt 62, protrudes from the chuck cap 54, as illustrated in FIG. 6, and is pulled taut through the space between the arms 40 until the cable 22 is stretched as much as possible by hand. The final tightening is accomplished by rotating the turnbuckle jaws 68.

FIG. 25 illustrates the invention used in the lifeline application in a multi-story building, where the lifeline is stretched between two columns 72 such as taught in the inventor's previous U.S. patent application Ser. No. 10/256,473.

While the invention has been described in complete detail and pictorially shown in the accompany drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A spring-loaded compression cable grab for attaching a wire rope cable to a fixed object comprising,
    a) a hollow cylindrical chuck having a first end and a second end, with a tapered socket formed within the hollow between the first end and the second end,
    b) a pair of bifurcated arms attached onto said chuck for attachment of the spring-loaded compression cable grab,
    c) a collet slideably disposed within the tapered socket of the hollow chuck, with said collet having a bore within an inside diameter compatible with a wire rope cable,
    d) a hollow chuck cap attached to the chuck second end,
    e) a compression spring disposed within the chuck between the collet and the chuck cap, urging the collet into the tapered socket such that after a cable has been inserted freely into the chuck's first end, the collet firmly grips the wire rope cable on the bore in the collet when a cable is pulled in an opposite direction, and
    f) a hollow bolt threadably attached to the chuck first end, when said hollow bolt is rotated inwardly against the collet the collet is forced away from the tapered socket, thus releasing the grip for removal of the cable grab from a wire rope cable.

2. The spring-loaded compression cable grab as recited in claim 1 wherein said hollow cylindrical chuck further comprises internal threads in the first end and internal threads in the second end for threadably receiving said hollow bolt in the first end and threadably receiving said hollow chuck cap in the second end.

3. The spring-loaded compression cable grab as recited in claim 1 wherein said hollow cylindrical chuck further comprises a cylindrical configuration having a enlarged circular portion on the first end, with the circular portion having a pair of opposed flats configured to receive said bifurcated arms.

4. The spring-loaded compression cable grab as recited in claim 1 wherein said pair of bifurcated arms further comprise a weld joint on a first end for attachment to said hollow cylindrical chuck.

5. The spring-loaded compression cable grab as recited in claim 1 wherein said pair of bifurcated arms have a shape that is offset to contiguously engage each arm on a second end opposite the weld joint.

6. The spring-loaded compression cable grab as recited in claim 5 wherein said pair of bifurcated arms having a hole through both arms at a second end for attachment to a fixed object.

7. The spring-loaded compression cable grab as recited in claim 1 wherein said collet further comprises a plurality of tapered segments retained with an o-ring on a largest end for gripping a cable contained by the bore formed within the segments.

8. The spring-loaded compression cable grab as recited in claim 7 wherein said collet tapered segments further comprise at least three discrete segments.

9. The spring-loaded compression cable grab as recited in claim 1 wherein said hollow chuck cap further comprises a set of external threads for attachment to said chuck.

10. The spring-loaded compression cable grab as recited in claim 9 wherein said chuck cap further comprises a knurled surface on an end opposite the external threads.

11. The spring-loaded compression cable grab as recited in claim 1 wherein said compression spring formed of a material selected from the group consisting of stainless steel and spring steel.

12. The spring-loaded compression cable grab as recited in claim 1 wherein said hollow bolt further comprises a hex head on one end and a plurality of external threads on the other, with the threads compatible with the first end hollow in the cylindrical chuck.

13. The spring-loaded compression cable grab as recited in claim 1 further comprising an all steel construction.

14. A spring-loaded compression cable grab for attaching a wire rope cable to a fixed object comprising,
    a) a hollow cylindrical chuck having a tapered socket formed within, and a pair of bifurcated arms attached to an outside surface of said chuck,
    b) a collet slideably disposed within the tapered socket, and a hollow chuck cap attached to the chuck,
    e) a compression spring disposed within the chuck for urging the collet into the tapered socket such that after a cable has been inserted into the chuck the collet firmly grips a wire rope cable when a cable is pulled in an opposite direction, and
    d) a hollow bolt attached to the chuck, for cable removal by rotating said bolt inwardly forcing the collet away from the tapered socket releasing the grip on the cable, and
    e) said hollow cylindrical chuck having internal threads in a first end and internal threads in a second end for threadably receiving said hollow bolt in the first end and threadably receiving said hollow chuck cap in the second end.

\* \* \* \* \*